US010256768B2

United States Patent
Owen et al.

(10) Patent No.: US 10,256,768 B2
(45) Date of Patent: Apr. 9, 2019

(54) PHOTOVOLTAIC ARRAY MOUNTING STRUCTURE

(71) Applicant: OMCO Solar, LLC, Phoenix, AZ (US)

(72) Inventors: Todd Owen, Litchfield Park, AZ (US); Kenneth Grum, Phoenix, AZ (US)

(73) Assignee: CMCO SOLAR, LLC, Phoenix, AZ (US)

( * ) Notice: Subject to any disclaimer, the term of this patent is extended or adjusted under 35 U.S.C. 154(b) by 0 days.

(21) Appl. No.: 15/138,171

(22) Filed: Apr. 25, 2016

(65) Prior Publication Data

US 2017/0310275 A1  Oct. 26, 2017

(51) Int. Cl.

| F24S 25/60 | (2018.01) |
|---|---|
| H02S 20/00 | (2014.01) |
| H02S 30/10 | (2014.01) |
| H02S 20/10 | (2014.01) |
| H02S 20/30 | (2014.01) |
| F24S 25/12 | (2018.01) |
| F24S 25/636 | (2018.01) |

(52) U.S. Cl.
CPC ............. H02S 30/10 (2014.12); F24S 25/12 (2018.05); F24S 25/636 (2018.05); H02S 20/10 (2014.12); H02S 20/30 (2014.12); F24S 2025/6007 (2018.05); Y02E 10/47 (2013.01)

(58) Field of Classification Search
CPC .......... F24J 2/5203; F24J 2/523; F24J 2/5258; F24J 2/5256; F24J 2002/522; H02S 30/10; H02S 20/10
See application file for complete search history.

(56) References Cited

U.S. PATENT DOCUMENTS

| 1,093,434 A | 4/1914 | Kent |
| 2,850,934 A | 9/1958 | Sehn |
| 3,999,389 A | 12/1976 | Bryce |
| (Continued) | | |

FOREIGN PATENT DOCUMENTS

| FR | 2951208 B1 * 12/2013 | ............. F24J 2/4614 |
| WO | WO-2013082125 A1 * 6/2013 | ............. F24J 2/5207 |

OTHER PUBLICATIONS

Search report and written opinion from the International Searching Authority, dated Nov. 10, 2016, for PCT Application No. US2016/041680.

*Primary Examiner* — Christine T Cajilig
(74) *Attorney, Agent, or Firm* — Tarolli, Sundheim, Covell & Tummino LLP (57) ABSTRACT

A photovoltaic mounting structure includes a frame for holding a photovoltaic array including a plurality of width-wise channels so as to permit photovoltaic modules to be easily slid between pairs of the channels, the photovoltaic modules resting upon flanges of the channels. In various embodiments, domed protrusions are disposed on lateral sides of the channel to prevent kinking of the modules and reduce friction, retention teeth are formed on upper surfaces of the flanges to position the modules; locator teeth are formed on lower surfaces of the flanges to guide the channels to predetermined spacing; and pre-installed mounting clips are attached to a top surface of the channel. The mounting clips each include an anti-rotation tab oriented downwardly and partially disposed in a corresponding hole in a top surface of the channel so as to prevent rotation of the mounting clip when a bolt of the mounting clip is rotated.

21 Claims, 10 Drawing Sheets

(56) References Cited

U.S. PATENT DOCUMENTS

| | | | |
|---|---|---|---|
| 4,100,915 A | 7/1978 | Carlson | |
| 4,205,657 A | 6/1980 | Kelly | |
| 4,243,018 A | 1/1981 | Hubbard | |
| 4,696,285 A | 9/1987 | Zwach | |
| 6,269,716 B1 | 8/2001 | Amis | |
| 7,677,242 B2 | 3/2010 | Carcangiu | |
| 8,052,100 B2 | 11/2011 | Zarte | |
| 8,161,962 B2 | 4/2012 | Kuo | |
| 8,267,359 B2 | 9/2012 | Zante et al. | |
| 8,495,997 B1* | 7/2013 | Laubach | F24J 2/5233 126/621 |
| 8,763,601 B2 | 7/2014 | Doyle | |
| 8,806,813 B2* | 8/2014 | Plaisted | F24J 2/5207 136/244 |
| 8,939,648 B2 | 1/2015 | Schneider et al. | |
| 8,991,114 B2* | 3/2015 | West | F24J 2/5211 52/173.3 |
| 9,584,062 B2 | 2/2017 | Ganshaw et al. | |
| 9,806,869 B2 | 10/2017 | De Wee | |
| 2001/0004099 A1 | 6/2001 | Onishi | |
| 2009/0314280 A1 | 12/2009 | Banerjee | |
| 2010/0163015 A1* | 7/2010 | Potter | F24J 2/045 126/600 |
| 2010/0275975 A1 | 11/2010 | Monschke et al. | |
| 2010/0294340 A1 | 11/2010 | Cunningham et al. | |
| 2011/0179606 A1 | 7/2011 | Magno et al. | |
| 2011/0214365 A1 | 9/2011 | Aftanas | |
| 2011/0240101 A1* | 10/2011 | Sagayama | F24J 2/4614 136/251 |
| 2011/0296773 A1* | 12/2011 | Kellerman | F24J 2/5203 52/173.3 |
| 2012/0031488 A1 | 2/2012 | Kaufman et al. | |
| 2012/0102853 A1 | 5/2012 | Rizzo | |
| 2012/0227791 A1* | 9/2012 | Vari | H02S 20/23 136/251 |
| 2012/0312356 A1* | 12/2012 | Mizuo | F24J 2/5233 136/251 |
| 2012/0325761 A1 | 12/2012 | Kubsch et al. | |
| 2013/0193297 A1 | 8/2013 | Hartelius et al. | |
| 2013/0240466 A1 | 9/2013 | Sponseller | |
| 2013/0334151 A1 | 12/2013 | Kanczuzewski et al. | |
| 2013/0335877 A1* | 12/2013 | Keller | H01R 4/64 361/220 |
| 2015/0000725 A1* | 1/2015 | Reilly | H02S 20/00 136/251 |
| 2015/0183066 A1 | 7/2015 | Lippert et al. | |
| 2015/0184896 A1* | 7/2015 | Lippert | H02S 20/00 211/41.1 |
| 2015/0222218 A1 | 8/2015 | Koyama | |
| 2016/0111997 A1* | 4/2016 | Ganshaw | H02S 20/23 248/224.7 |
| 2017/0102168 A1 | 4/2017 | Childress | |
| 2017/0104445 A1* | 4/2017 | Depauw | H02S 30/10 |
| 2017/0133975 A1* | 5/2017 | Ganshaw | H02S 20/23 |
| 2017/0346437 A1 | 11/2017 | Owen | |

\* cited by examiner

PHOTOVOLTAIC ARRAY MOUNTING STRUCTURE

BACKGROUND OF THE INVENTION

1. Field of the Invention

The present invention relates to a photovoltaic array mounting structure, particularly useful for large-scale electric power generation systems.

2. Description of the Related Art

A photovoltaic module includes numerous photovoltaic cells that are packaged into a single unit. The photovoltaic cells are electrically connected in series or parallel, to produce higher voltages and current. Photovoltaic modules can be electrically connected and arranged on various mounting structures to form a photovoltaic array. For large-scale commercial or utility electricity generation, the photovoltaic modules are often arranged on long frames elevated from a ground surface and tilted at a desired angle. These photovoltaic mounting structures are typically laid row upon row, and may take up many acres of outdoor space.

However, installation of photovoltaic array mounting structures and particularly mounting the photovoltaic modules onto the mounting structures is time-consuming and labor intensive. The high labor costs reflect the difficulty and requisite skills needed to install these systems. Additionally, installation can be problematic from a quality assurance perspective and current techniques often raise safety concerns as well.

SUMMARY OF THE INVENTION

The present disclosure relates to a novel photovoltaic mounting structure that includes various features to markedly reduce installation effort and ensure a proper construction. In an embodiment, the photovoltaic mounting structure includes a frame for holding a photovoltaic array, the frame having a width and a length sufficient to accommodate the photovoltaic array. The frame includes a plurality of widthwise "top hat" channels spaced substantially evenly and in parallel so as to permit photovoltaic modules of the photovoltaic array to be easily inserted between pairs of the channels, the photovoltaic modules resting upon outwardly extended flanges of the channels. Additionally, the frame further comprises a plurality of lengthwise beams spaced substantially perpendicular to the widthwise channels. In an embodiment, the channels include downwardly oriented locator teeth to guide the channels along predetermined spacing across the lengthwise beams. The photovoltaic mounting structure also includes supports attached to the lengthwise beams that can include ground posts and bracing, for example, to elevate the frame from a ground surface. The supports may also allow the frame to be tilted at a desired angle.

In an embodiment, the top hat channels include a top surface, a pair of lateral sides extending downwardly, and a pair of flanges extending outwardly. The lateral sides of the channels are substantially flat (and smooth) except for having occasional dome-shaped protrusions that are added to reduce friction and eliminate kinking of the modules as they are inserted. Additionally, the flanges of the channels include upwardly oriented retention teeth structured and arranged so as to permit retention of the photovoltaic modules in predetermined positions, and at the same time permit the photovoltaic modules to be slid past the teeth during installation prior to being clamped down.

In an embodiment, a plurality of pre-installed mounting clips is disposed on the channels, the mounting clips capable of clamping the photovoltaic modules. To reduce installation effort, each of the pre-installed mounting clips is initially connected to a channel by partially-screwed bolting into pre-drilled holes, the mounting clips elevated using a nylon retaining washer or the like. Advantageously, this arrangement allows the photovoltaic modules to be inserted between pairs of the channels during installation, and then the mounting clips can be clamped onto the photovoltaic modules by simply tightening the bolting. Additionally, the pre-installed mounting clips each include an anti-rotation tab oriented downwardly and partially disposed in a corresponding hole in a top surface of a respective channel so as to prevent rotation of the mounting clip when the bolt of the mounting clip is rotated.

DETAILED DESCRIPTION OF THE INVENTION

Figure 1:
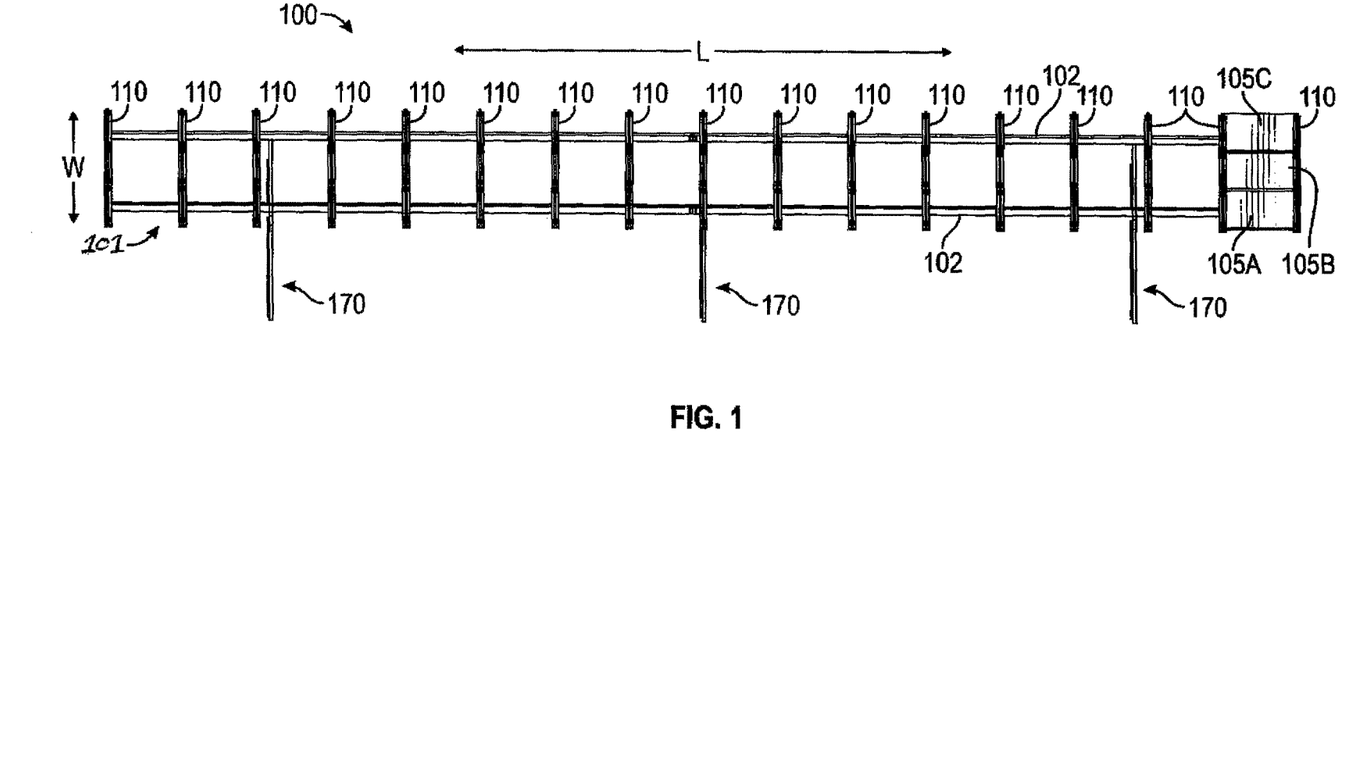
FIG. 1 illustrates a front view of an exemplary photovoltaic mounting structure, according to an embodiment.

Referring to FIG. 1, an exemplary photovoltaic mounting structure 100, according to an embodiment, is illustrated. The photovoltaic mounting structure 100 includes a frame 101 for holding a photovoltaic array. For illustrative purposes, the photovoltaic array is shown only partially built. In particular, only a single column of photovoltaic modules 105A-C is installed. In general, the frame 101 has a width W and a length L sufficient to accommodate the desired size of the photovoltaic array. Accordingly, the spacing and arrangement of the components may be varied from those shown to accommodate different sizes, thicknesses, and quantities of photovoltaic modules. As illustrated, the frame 101 includes a plurality of widthwise top hat channels 110 spaced substantially evenly and in parallel. As will be described in greater detail, the novel design permits photovoltaic modules, such as the modules 105A-C, to be easily slid between pairs of the channels 110 and held firmly in place. Additionally, the frame 101 comprises lengthwise beams 102 spaced substantially perpendicular to the widthwise channels 110, to provide structural stability and support to the frame 101. Although the illustrated embodiment shows two such beams 102, it is to be understood that the actual number of beams 102 may be different. The frame 101 is raised from the ground using a plurality of exemplary supports 170 which are connected to the lengthwise beams 102.

Figure 2:
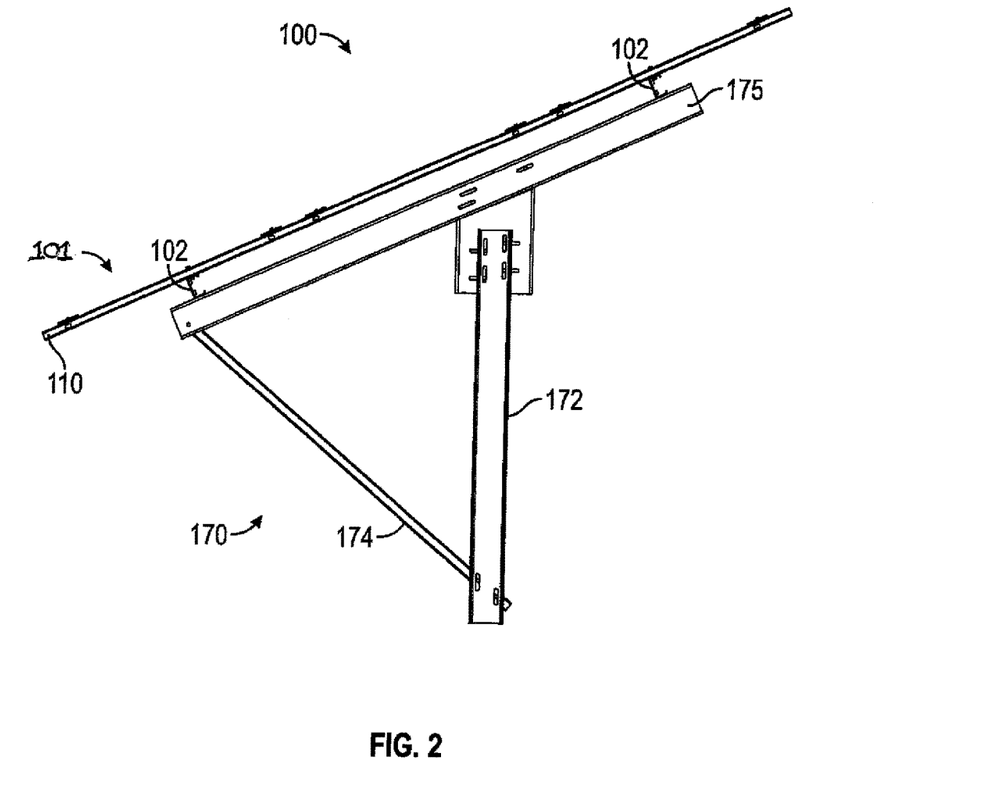
FIG. 2 illustrates a side view of the photovoltaic mounting structure.

Referring to FIG. 2, a side view of the photovoltaic mounting structure 100 is illustrated including an exemplary support 170. As shown, support 170 includes a post 172 secured to the ground surface, bracing 174 to provide additional support, and a support beam 175. As depicted, the lengthwise beams 102 are attached to an upper surface of beam 175 and the widthwise channels 110 are attached to pairs of the lengthwise beams 102. Although the illustrated support 170 can be used in conjunction with the frame 101, it is to be understood that various other types of suitable ground support structures could be used. In some embodiments, the posts will be anchored to concrete slabs, dual posts will be employed, additional or different bracing will be present, etc.

Figure 3:
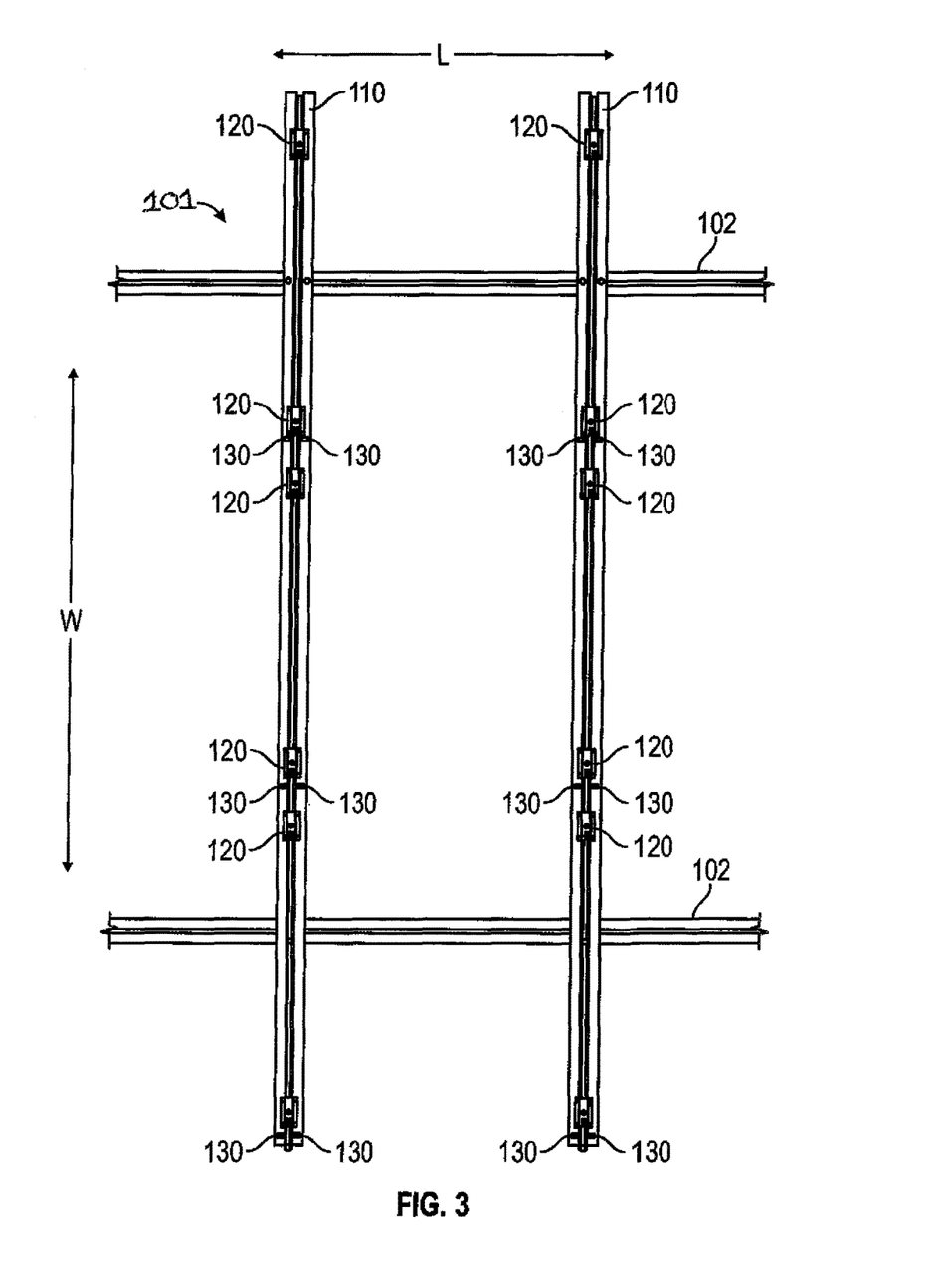
FIG. 3 illustrates a close-up view of a section of the frame of the photovoltaic mounting structure.

Referring to FIG. 3, a close-up view of a section of the frame 101 is illustrated. As shown, the widthwise channels 110 are arranged on top of and substantially parallel to the lengthwise beams 102. As will be described in greater detail, photovoltaic modules can be inserted between pairs of the channels 110, the photovoltaic modules resting upon outwardly extended flanges of the channels 110. Additionally, the flanges of the channels include upwardly oriented retention teeth 130 structured and arranged so as to permit retention of the photovoltaic modules in predetermined positions forming a grid (array), and at the same time permit the photovoltaic modules to be slid past the retention teeth 130 during installation prior to being clamped down. As shown in FIG. 3, three photovoltaic modules could be inserted between the pair of channels 110 shown in this figure. Although the illustrated embodiment shows columns of three photovoltaic modules, it is to be understood that the frame 101 may be constructed so as to accommodate a different number of photovoltaic modules. In this case, the number of retention teeth 130 would vary from the illustration.

Figure 4:
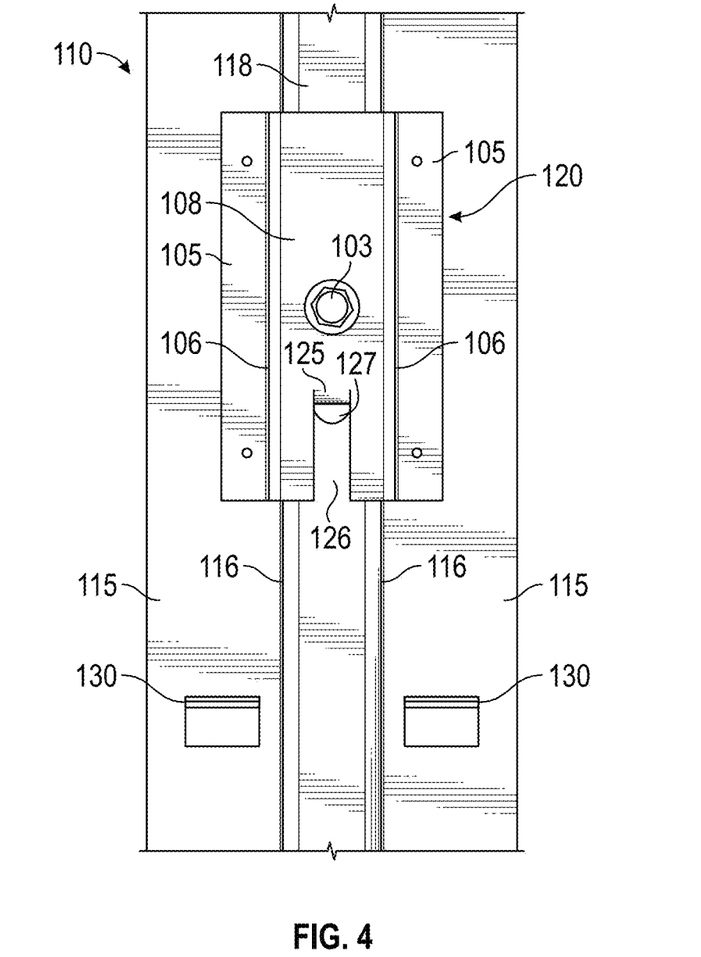
FIG. 4 illustrates a top plan view of an exemplary mounting clip on the frame.

Referring to FIG. 4, a top plan view of an exemplary mounting clip 120 installed on a channel 110 is illustrated. As shown, the mounting clip 120 fits onto a top surface 118 of the channel 110. The mounting clip 120 includes flanges 122 that are parallel to flanges 115 of the channel 110. As can be seen, bolt 103 secures the mounting clip 120 onto the top surface 118. Additionally, an anti-rotation tab 125 extends downwardly into a corresponding hole 127 in the top surface 118 so as to prevent rotation of the mounting clip 120 as the bolt 103 is turned. The hole 127 can be formed by punching or another suitable fabrication process. The anti-rotation tab 125 and the retention teeth 130 can be formed by cutting or punching flaps (which are then bent at an appropriate angle) or by another suitable fabrication process. In other embodiments, the retention teeth will be have a different structure from the illustrated structure but will achieve substantially the same function.

Figure 5:
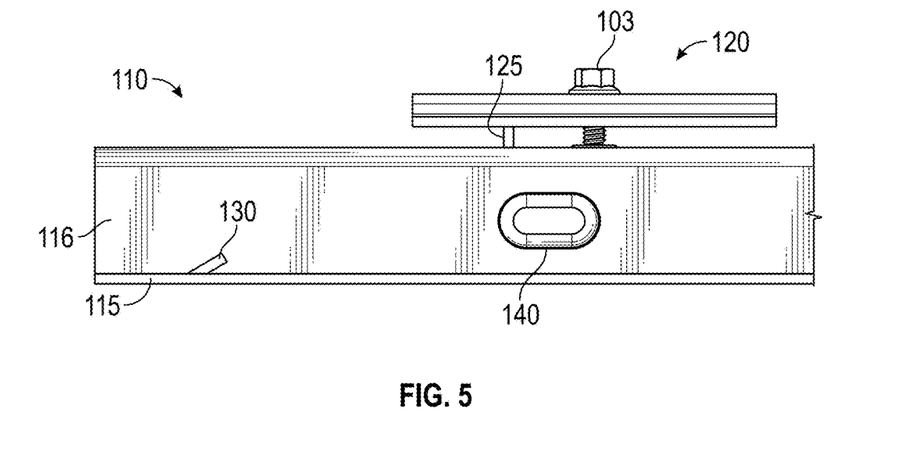
FIGS. 5 and 6 illustrate side views of the mounting clip.
Figure 6:
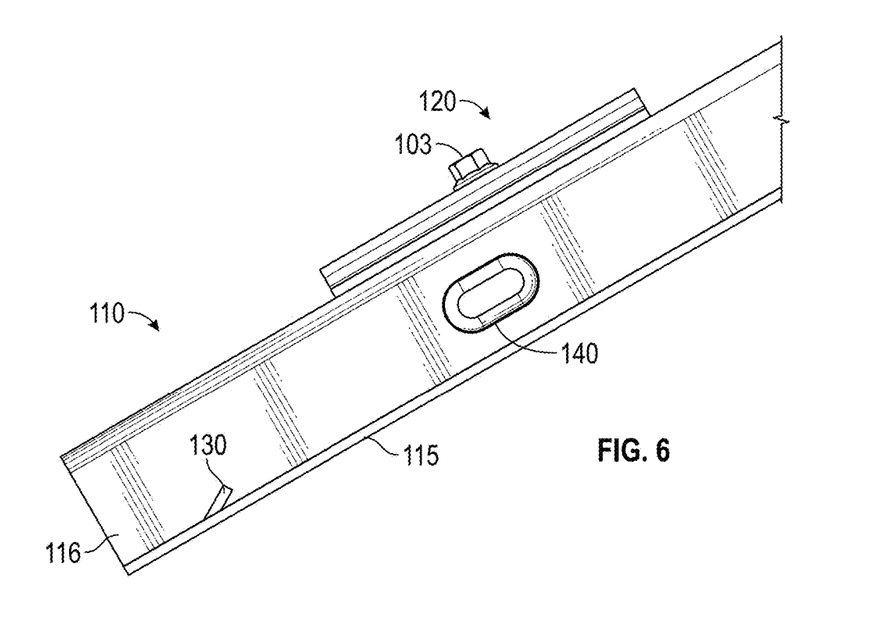

Referring to FIGS. 5 and 6, side views of the mounting clip 120 are illustrated. As shown, the retention teeth 130 extend at an acute angle relative to the respective flanges 115. FIG. 5 shows the mounting clip 120 in its initial configuration. Initially, the mounting clip 120 will be pre-installed on the channel 110 using partially-screwed bolting into pre-drilled holes. FIG. 6 shows the mounting clip 120 fully bolted onto the channel 110, done in the field as the photovoltaic array is constructed. Also shown are domed protrusions 140 disposed on relatively smooth lateral sides 116 of the channel 110 to prevent kinking of the modules and reduce friction as the modules are inserted. It is to be understood that the protrusions 140 can assume a different shape from the illustrated "dome" shape without departing from the spirit or scope of the present invention.

Figure 7:
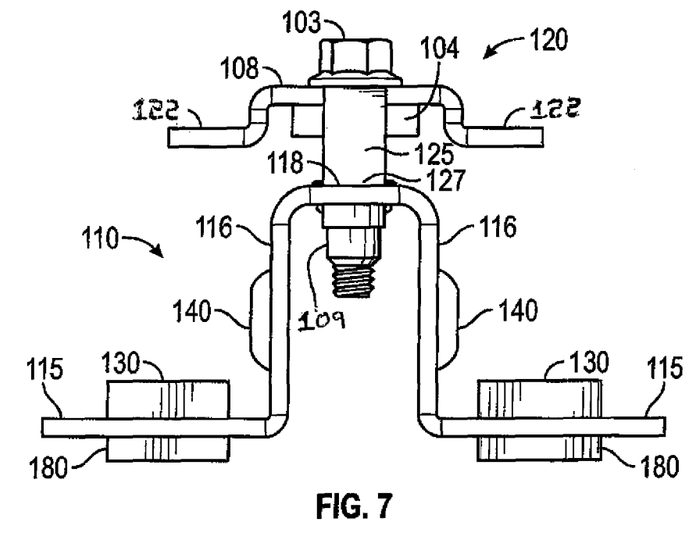
FIG. 7 illustrates a cutaway side view of the mounting clip.

Referring to FIG. 7, a cutaway side view of the mounting clip 120 is illustrated. In this view, the mounting clip 120 is in its initial configuration (similar to FIG. 5). The bolt 103 is already inserted through a hole in the top surface 118 of the channel 110, and partially threaded into a nut 109 or the like. The mounting clip 120 is elevated and held in place using a retaining washer 104 or the like. In an embodiment, the retaining washer 104 is a nylon or rubber retaining washer. In other embodiments, a different type of retaining device may be used, such as a push nut. Once the photovoltaic modules are inserted along sides of the channel 110, bottom corners of the photovoltaic modules will rest upon respective lateral sides 116 and flanges 115 of the channel 110. The bolt 103 will then be tightened such that the mounting clip 120 acts a clamp to hold in place the photovoltaic modules. Advantageously, the anti-rotation tabs 125 ensure that the mounting clip 120 will not rotate as the bolt 103 is turned.

Figure 8:
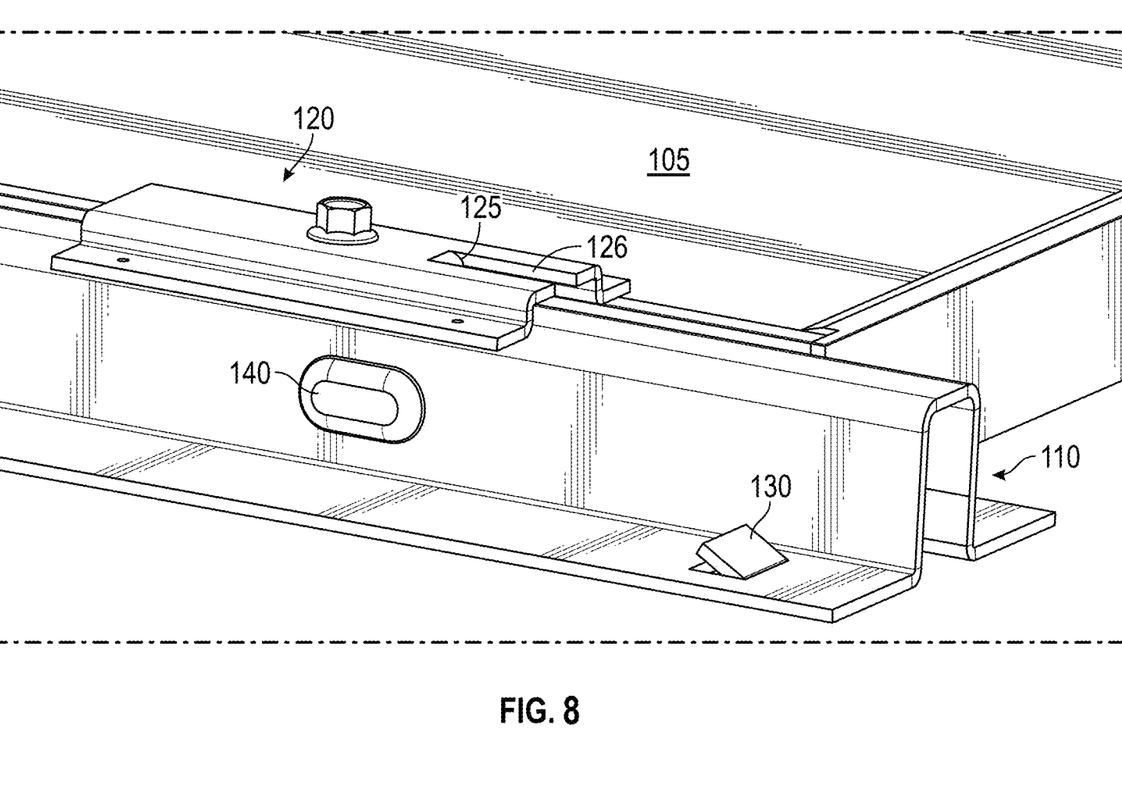
FIG. 8 illustrates a perspective view of a photovoltaic module installed on the frame.
Figure 9:
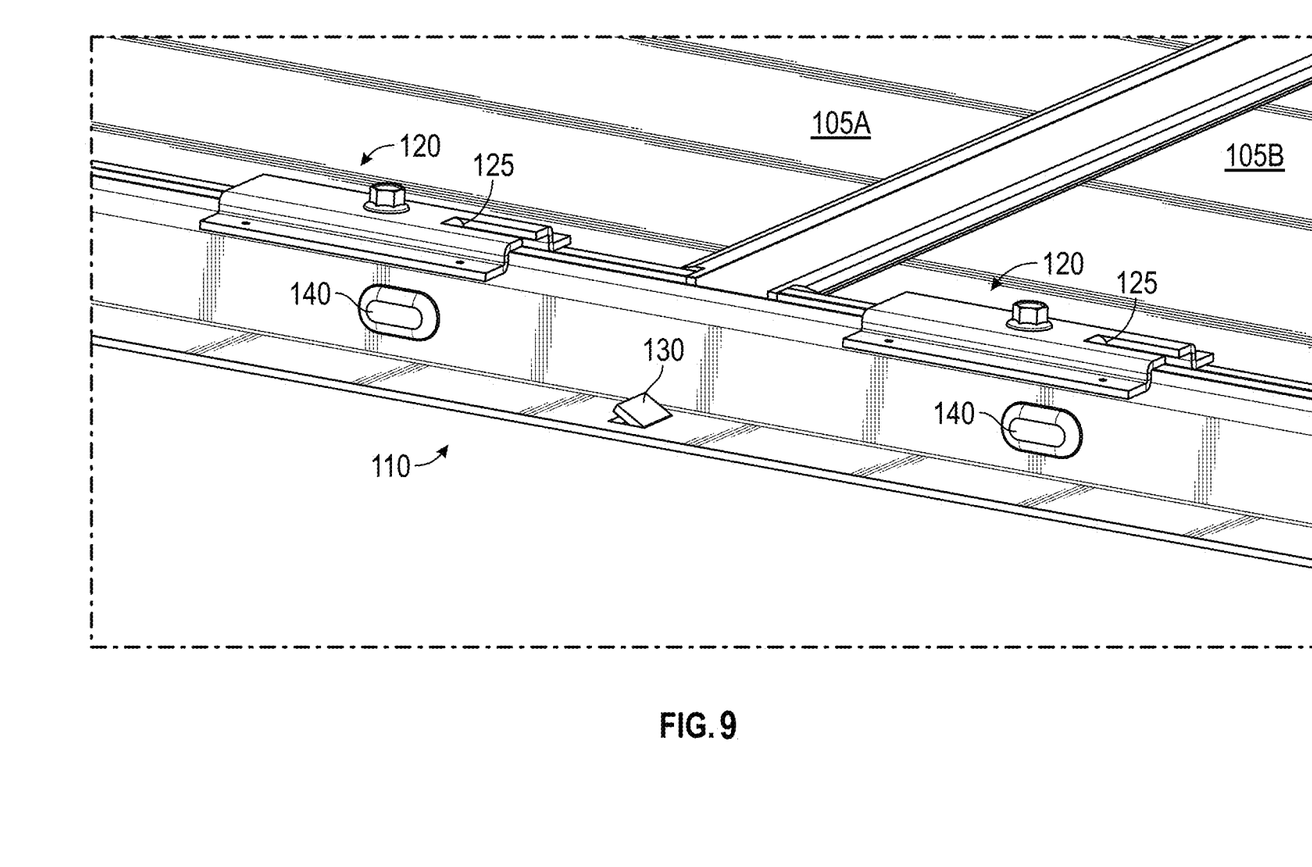
FIG. 9 illustrates a perspective view of multiple photovoltaic modules installed on the frame.

Referring to FIG. 8, a perspective view of a photovoltaic module 105 installed on the frame 125 is illustrated. Note that the mounting clip 120 overlaps the photovoltaic module 105 so as to hold the photovoltaic module 105 firmly. FIG. 9 illustrates a perspective view of multiple photovoltaic modules 105A, 105B installed on the frame 125.

Figure 10:
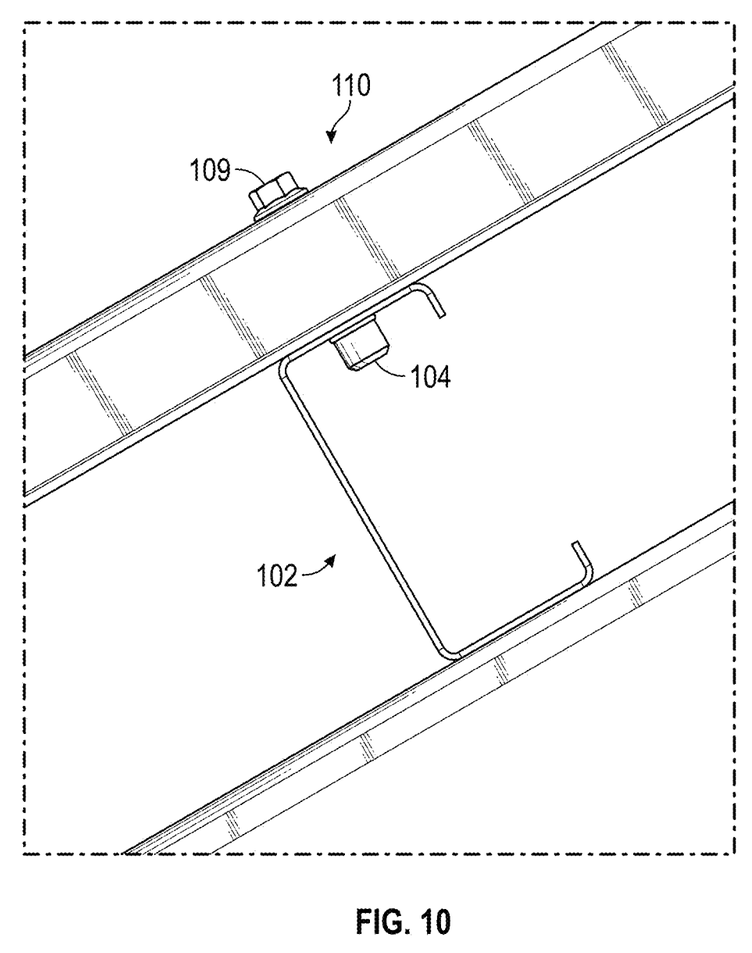
FIG. 10 illustrates a side view of an exemplary lengthwise beam of the frame.

Referring to FIG. 10, a side view of an exemplary lengthwise beam 109 of the frame 125 is illustrated. As shown, the lengthwise beam 102 is a "C-beam" but other types of beams or the like may suffice. As mentioned, the lengthwise beams 102 are substantially perpendicular to the channels 110. As depicted, a lengthwise beam 102 is shown fastened (using a bolt 103/nut 109 combination) to a widthwise channel 110. It is to be understood that many such channels 100 would be fastened to the lengthwise beam 102 along the length of the frame 125 (see FIG. 1).

Figure 11:
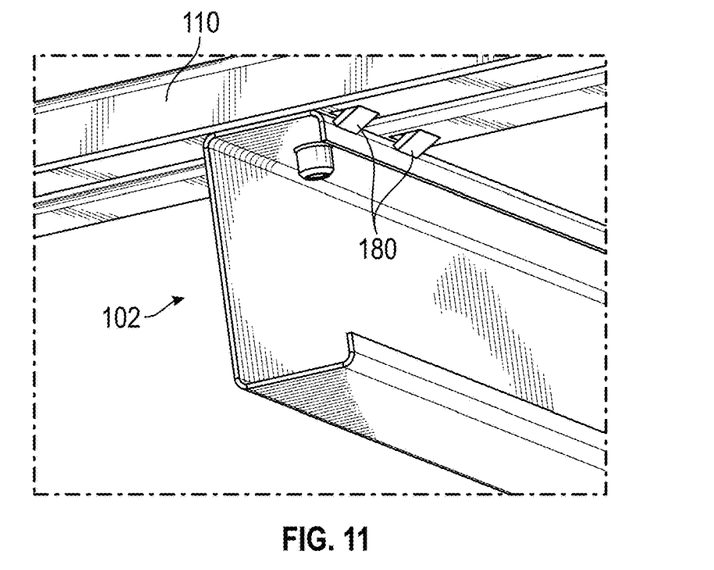
FIGS. 11 and 12 illustrate exemplary locator teeth used for spacing the channels along a lengthwise beam.
Figure 12:
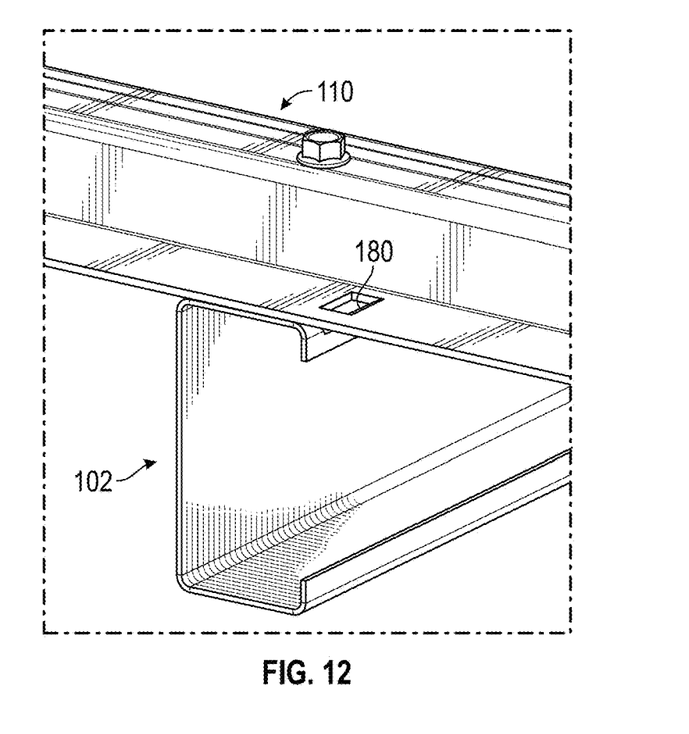

Referring to FIGS. 11 and 12, a pair of exemplary locator teeth 180 used for spacing the channels 110 along lengthwise beam 102 is illustrated. More particularly, each of the channels 110 includes several such pairs of downwardly-oriented teeth 180 on an underside disposed at locations where the channels 110 and the lengthwise beams 102 are to intersect. The teeth 180 greatly facilitate constructing the frame 125 in the field since it is not necessary to measure where to position the channels 110 along the lengthwise beams 102. All that is required is for a worker to lay the channels 100 such that the locator teeth 180 align with the beams 102, an example shown. The locator teeth 180 can be formed by punching or cutting a flap in the flanges 115 of the channel 110, then bending the flap downwardly at an acute angle, for example, or by another suitable fabrication process. In other embodiments, the locator teeth will be have a different structure from the illustrated "tooth" structure but will achieve substantially the same function.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A photovoltaic array mounting structure for supporting a photovoltaic array including a plurality of photovoltaic modules, each photovoltaic module having a length and a width, the photovoltaic array mounting structure comprising:
- a) a frame for holding the plurality of photovoltaic modules of the photovoltaic array, the frame including;
  - i) a plurality of spaced apart, parallel lengthwise beams extending in a first direction along the length of the frame;
  - ii) a plurality of spaced apart, parallel widthwise channels disposed on the plurality of lengthwise beams, the plurality of widthwise channels extending in a second direction along the width of the frame, the plurality of widthwise channels being spaced so as to receive the plurality of photovoltaic modules of the photovoltaic array between adjacent pairs of the plurality of widthwise channels, each channel of the plurality of widthwise channels including a top surface extending along the channel, a pair of lateral sides including a first lateral side and a second lateral side extending downwardly from opposite sides the top surface and a pair of flanges, a first flange of the pair of flanges extending outwardly from the first lateral side of the pair of lateral sides and a second flange of the pair of flanges extending outwardly from the second lateral side of the pair of lateral side, the top surface of the channel including a plurality of spaced apart fastener-receiving holes and a plurality of spaced apart anti-rotation tab holes, each anti-rotation tab hole of the plurality of anti-rotation tab holes being spaced from a corresponding fastener-receiving hole of the plurality of fastener-receiving holes by a predetermined distance as measured along a longitudinal extent of the top surface of the channel, edge portions of individual photovoltaic modules of the plurality of photovoltaic modules resting upon facing flanges of adjacent pairs of the plurality of widthwise channels;
  - iii) a plurality of mounting clips, each mounting clip of the plurality of mounting clips disposed on a top surface of a respective channel of the plurality of widthwise channels, each mounting clip including a mounting hole, a downwardly extending anti-rotation tab spaced from the mounting hole and an outwardly extending pair of flanges;
  - iv) a plurality of fasteners, for each mounting clip of the plurality of mounting clips, a fastener of the plurality of fasteners extending through the mounting hole of the mounting clip and into a fastener-receiving hole in the top surface of the corresponding channel to secure the mounting clip to the top surface of the channel, the anti-rotation tab being received in a respective anti-rotation tab hole of the top surface of the channel to prevent rotation of the mounting clip with respect to the channel as the fastener is tightened; and
- b) a plurality of supports connected to the plurality of lengthwise beams for elevating the frame.

2. The photovoltaic array mounting structure of claim 1 wherein the first direction is orthogonal to the second direction and the plurality of widthwise channels are spaced substantially evenly.

3. The photovoltaic array mounting structure of claim 1 wherein for each of mounting clip of the plurality of mounting clips, the mounting hole is spaced from the anti-rotation tab by a distance corresponding to the predetermined distance spacing the fastener-receiving hole from the corresponding anti-rotation hole, as measured along a longitudinal extent of the top surface of the channel.

4. The photovoltaic array mounting structure of claim 1 wherein for each channel of the plurality of widthwise channels, the first and second lateral sides each including at a plurality of dome-shaped protrusions extending outwardly from the first and second lateral sides.

5. The photovoltaic array mounting structure of claim 1 wherein the flanges of the channels include upwardly oriented retention teeth.

6. The photovoltaic array mounting structure of claim 1 wherein for each mounting clip of the plurality of mounting clips, the downwardly extending anti-rotation tab comprises a downwardly bent flap of the mounting clip.

7. The photovoltaic array mounting structure of claim 1 wherein each mounting clip of the plurality of mounting clips are attached to the channels prior to installation and each fastener of the plurality of fasteners comprises a threaded bolt and a retaining washer to raise corresponding flanges of the mounting clip upwardly with respect the pair of flanges of a corresponding channel of the plurality of widthwise channels.

8. The photovoltaic array mounting structure of claim 1 wherein each of the plurality of widthwise channels include downwardly oriented locator teeth to locate the channels of the plurality of widthwise channels along the plurality of lengthwise beams as the channels are attached to the beams.

9. A frame for a photovoltaic array mounting structure for supporting a photovoltaic array including a plurality of photovoltaic modules, the frame comprising:
- a) a plurality of spaced apart, parallel lengthwise beams extending in a first direction along the length of the frame;
- b) a plurality of spaced apart, parallel widthwise channels disposed on the plurality of lengthwise beams, the plurality of widthwise channels extending in a second direction along the width of the frame, the plurality of widthwise channels being spaced so as to receive the plurality of photovoltaic modules of the photovoltaic array between adjacent pairs of the plurality of widthwise channels, each channel of the plurality of widthwise channels including a top surface extending along the channel, a pair of lateral sides including a first lateral side and a second lateral side extending downwardly from opposite sides the top surface and a pair of flanges, a first flange of the pair of flanges extending outwardly from the first lateral side of the pair of lateral sides and a second flange of the pair of flanges extending outwardly from the second lateral side of the pair of lateral side, the top surface of the channel including a plurality of spaced apart fastener-receiving holes and a plurality of spaced apart anti-rotation tab holes, each anti-rotation tab hole of the plurality of anti-rotation tab holes being spaced from a corresponding fastener-receiving hole of the plurality of fastener-receiving holes by a predetermined distance as measured along a longitudinal extent of the top surface of the channel, edge portions of individual photovoltaic modules of the plurality of photovoltaic modules resting upon facing flanges of adjacent pairs of the plurality of widthwise channels;
- c) a plurality of mounting clips, each mounting clip of the plurality of mounting clips disposed on a top surface of a respective channel of the plurality of widthwise channels, each mounting clip including a mounting hole, a downwardly extending anti-rotation tab spaced from the mounting hole and an outwardly extending pair of flanges; and d) a plurality of fasteners, for each mounting clip of the plurality of mounting clips, a fastener of the plurality of fasteners extending through the mounting hole of the mounting clip and into a fastener-receiving hole in the top surface of the corresponding channel to secure the mounting clip to the top surface of the channel, the anti-rotation tab being received in a respective anti-rotation tab hole of the top surface of the channel to prevent rotation of the mounting clip with respect to the channel as the fastener is tightened.

10. The frame of claim 9 wherein the first direction is orthogonal to the second direction and the plurality of widthwise channel are spaced substantially evenly.

11. The frame of claim 9 wherein for each of mounting clip of the plurality of mounting clips, the mounting hole being spaced from the anti-rotation tab by a distance corresponding to the predetermined distance spacing the fastener-receiving hole from the corresponding anti-rotation hole, as measured along a longitudinal extent of the top surface of the channel.

12. The frame of claim 9 wherein for each channel of the plurality of widthwise channels, the first and second lateral sides each include a plurality of dome-shaped protrusions extending outwardly from the first and second lateral sides.

13. The frame of claim 9 wherein for each of the channels of the plurality of widthwise channels, the flanges of the channels include upwardly oriented retention teeth.

14. The frame of claim 9 wherein for each mounting clip of the plurality of mounting clips, the downwardly extending anti-rotation tab comprises a downwardly bent flap of the mounting clip.

15. The frame of claim 9 wherein for each mounting clip of the plurality of the mounting clips, the mounting clip is attached to a corresponding channel of the plurality of widthwise channels using a fastener of the plurality of fasteners prior to insertion of the plurality of photovoltaic modules into the frame.

16. The frame of claim 9 wherein each mounting clip of the plurality of mounting clips are attached to the channels prior to installation and each fastener of the plurality of fasteners comprises a threaded bolt and a retaining washer to raise corresponding flanges of the mounting clip upwardly with respect the pair of flanges of a corresponding channel of the plurality of widthwise channels.

17. The frame of claim 9 wherein each of the plurality of widthwise channels include downwardly oriented locator teeth to locate the channels of the plurality of widthwise channels along the plurality of lengthwise beams as the channels are attached to the beams.

18. A photovoltaic array comprising:
a) a photovoltaic array including a plurality of photovoltaic modules, each photovoltaic module having a length and a width;
b) a photovoltaic array frame having a width and a length for supporting the photovoltaic array, the photovoltaic array frame comprising:
i) a plurality of spaced apart, parallel lengthwise beams extending in a first direction along the length of the frame;
ii) a plurality of spaced apart, parallel widthwise channels disposed on the plurality of lengthwise beams, the plurality of widthwise channels extending in a second direction along the width of the frame, the plurality of widthwise channels being spaced so as to receive the plurality of photovoltaic modules of the photovoltaic array between adjacent pairs of the plurality of widthwise channels, each channel of the plurality of widthwise channels including a top surface extending along the channel, a pair of lateral sides including a first lateral side and a second lateral side extending downwardly from opposite sides the top surface and a pair of flanges, a first flange of the pair of flanges extending outwardly from the first lateral side of the pair of lateral sides and a second flange of the pair of flanges extending outwardly from the second lateral side of the pair of lateral side, the top surface of the channel including a plurality of spaced apart fastener-receiving holes and a plurality of spaced apart anti-rotation tab holes, each anti-rotation tab hole of the plurality of anti-rotation tab holes being spaced from a corresponding fastener-receiving hole of the plurality of fastener-receiving holes by a predetermined distance as measured along a longitudinal extent of the top surface of the channel, edge portions of individual photovoltaic modules of the plurality of photovoltaic modules resting upon facing flanges of adjacent pairs of the plurality of widthwise channels; and
iii) a plurality of mounting clips, each mounting clip of the plurality of mounting clips disposed on a top surface of a respective channel of the plurality of widthwise channels, each mounting clip including a mounting hole, a downwardly extending anti-rotation tab spaced from the mounting hole and an outwardly extending pair of flanges, a downwardly extending anti-rotation tab and an outwardly extending pair of flanges; and
iv) a plurality of fasteners, for each mounting clip of the plurality of mounting clips, a fastener of the plurality of fasteners extending through the mounting hole of the mounting clip and into a fastener-receiving hole in the top surface of the corresponding channel to secure the mounting clip to the top surface of the channel, the anti-rotation tab being received in a respective anti-rotation tab hole of the top surface of the channel to prevent rotation of the mounting clip with respect to the channel as the fastener is tightened, upon tightening of the fastener, the pair of flanges of the mounting clip bear against edge portions of respective photovoltaic modules of the plurality of photovoltaic modules to hold the respective photovoltaic modules in place with respect to the plurality of widthwise channels.

19. The photovoltaic array of claim 18 wherein for each channel of the plurality of widthwise channels, the first and second lateral sides each include a plurality of dome-shaped protrusions extending outwardly from the respective first and second lateral sides.

20. The photovoltaic array of claim 18 wherein for each of the channels of the plurality of widthwise channels, the flanges of the channels include upwardly oriented retention teeth structured and arranged so as to permit retention of the photovoltaic modules in predetermined positions.

21. A photovoltaic array mounting structure for supporting a photovoltaic array including a plurality of photovoltaic modules, each photovoltaic module having a length and a width, the photovoltaic array mounting structure comprising:
a) a frame for holding the plurality of photovoltaic modules of the photovoltaic array, the frame including;
i) at least one lengthwise beam extending in a first direction along the length of the frame;
ii) a plurality of spaced apart, parallel widthwise channels disposed on the at least one lengthwise beam, the plurality of widthwise channels extending in a second direction along the width of the frame, the plurality of widthwise channels being spaced so as to receive the plurality of photovoltaic modules of the photovoltaic array between adjacent pairs of the plurality of widthwise channels, each channel of the plurality of widthwise channels including a top surface extending along the channel, a pair of lateral sides including a first lateral side and a second lateral side extending downwardly from opposite sides the top surface and a pair of flanges, a first flange of the pair of flanges extending outwardly from the first lateral side of the pair of lateral sides and a second flange of the pair of flanges extending outwardly from the second lateral side of the pair of lateral side, the top surface of the channel including a plurality of spaced apart fastener-receiving holes and a plurality of spaced apart anti-rotation tab holes, each anti-rotation tab hole of the plurality of anti-rotation tab holes being spaced from a corresponding fastener-receiving hole of the plurality of fastener-receiving holes by a predetermined distance as measured along a longitudinal extent of the top surface of the channel, edge portions of individual photovoltaic modules of the plurality of photovoltaic modules resting upon facing flanges of adjacent pairs of the plurality of widthwise channels;

iii) a plurality of mounting clips, each mounting clip of the plurality of mounting clips disposed on a top surface of a respective channel of the plurality of widthwise channels, each mounting clip including a mounting hole, a downwardly extending anti-rotation tab spaced from the mounting hole and an outwardly extending pair of flanges; and iv) a plurality of fasteners, for each mounting clip of the plurality of mounting clips, a fastener of the plurality of fasteners extending through the mounting hole of the mounting clip and into a fastener-receiving hole in the top surface of the corresponding channel to secure the mounting clip to the top surface of the channel, the anti-rotation tab being received in a respective anti-rotation tab hole of the top surface of the channel to prevent rotation of the mounting clip with respect to the channel as the fastener is tightened.

* * * * *

UNITED STATES PATENT AND TRADEMARK OFFICE
CERTIFICATE OF CORRECTION

PATENT NO.         : 10,256,768 B2
APPLICATION NO.    : 15/138171
DATED              : April 9, 2019
INVENTOR(S)        : Owen et al.

Page 1 of 1

It is certified that error appears in the above-identified patent and that said Letters Patent is hereby corrected as shown below:

On the Title Page (73) delete "CMCO SOLAR, LLC, Phoenix, AZ (US)", and insert therefor --OMCO SOLAR, LLC, Phoenix, AZ (US)--.

Signed and Sealed this
Ninth Day of July, 2019

Andrei Iancu
*Director of the United States Patent and Trademark Office*